June 8, 1943. R. SCHELLING 2,321,427
COOKING EQUIPMENT
Filed Jan. 21, 1942 3 Sheets-Sheet 2
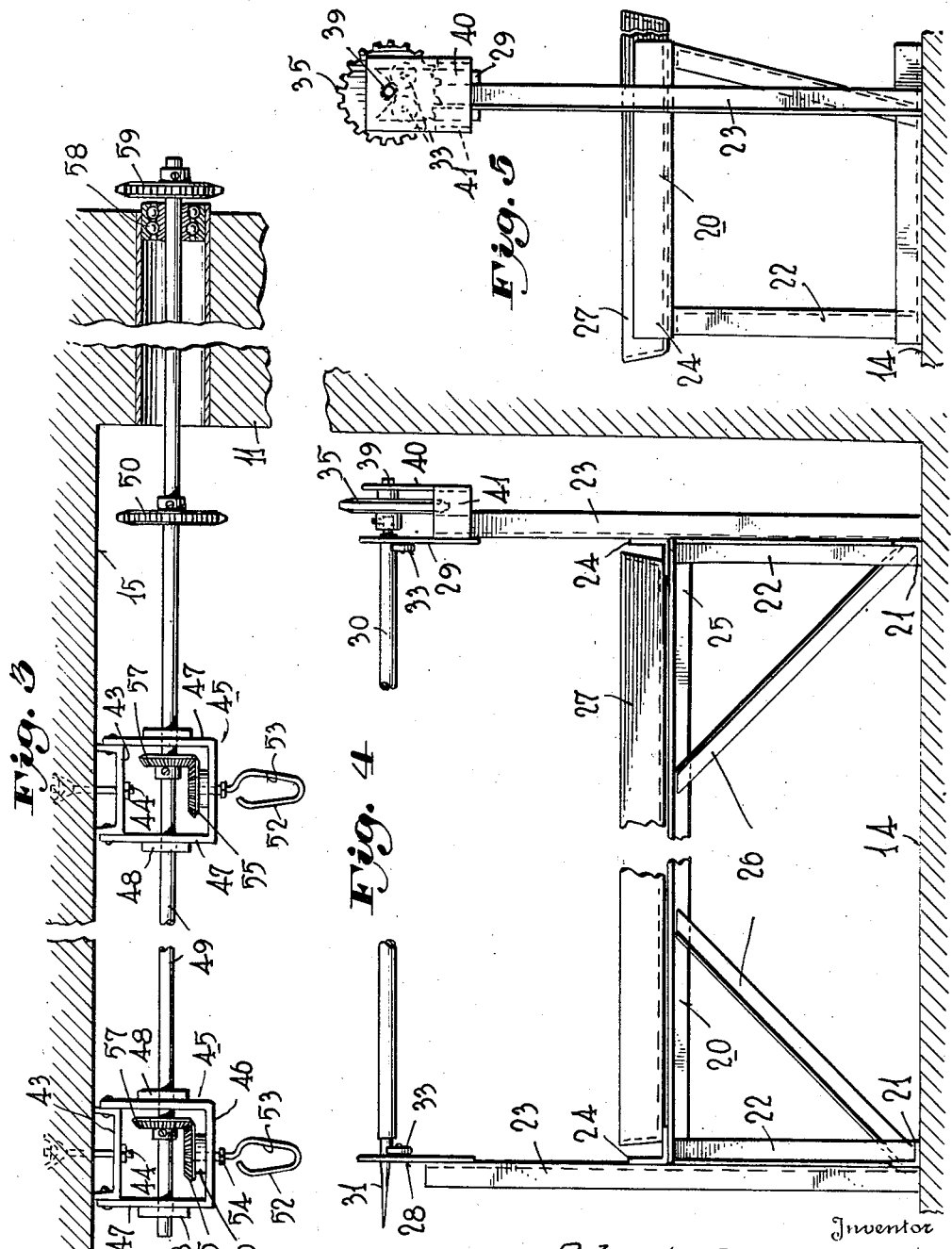
Inventor
Robert Schelling
By Seymour, Bright & Nottingham
Attorneys

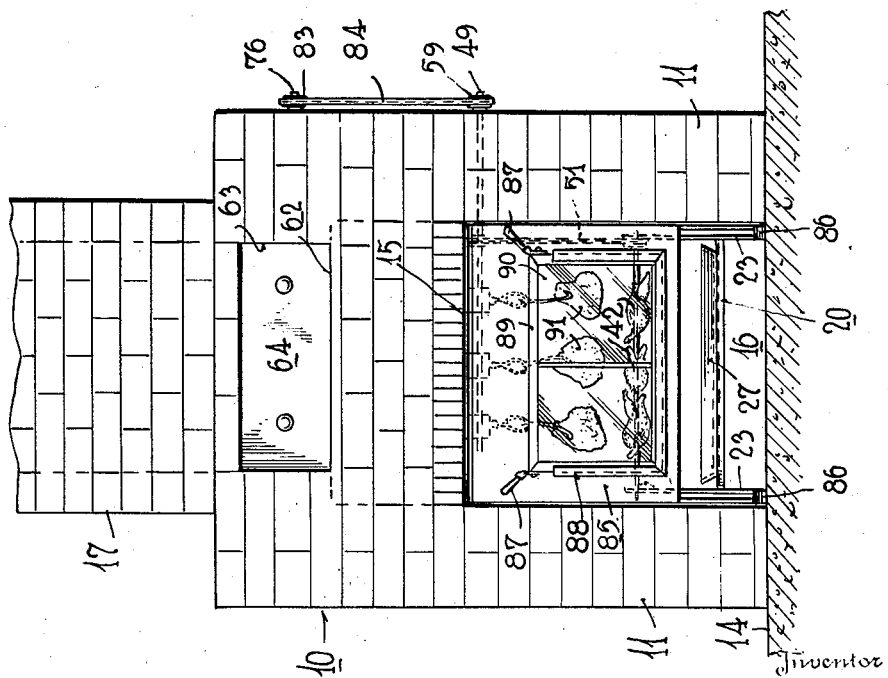

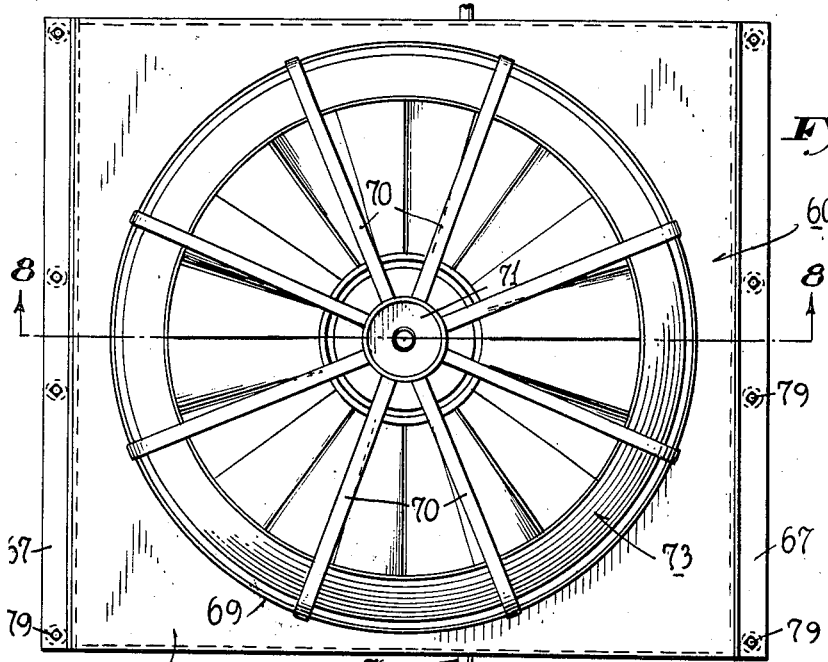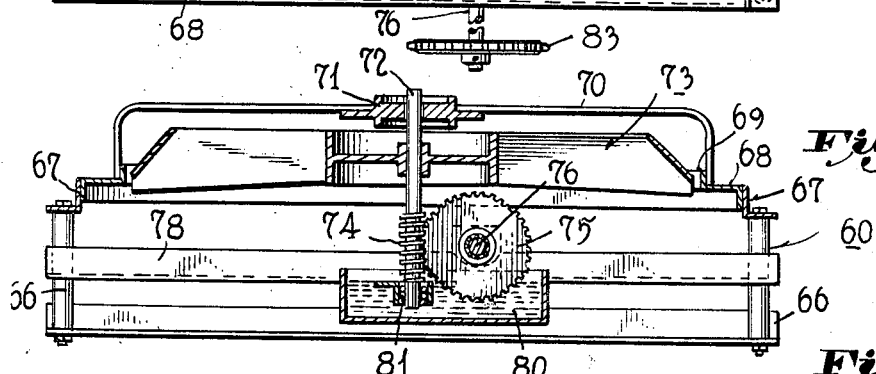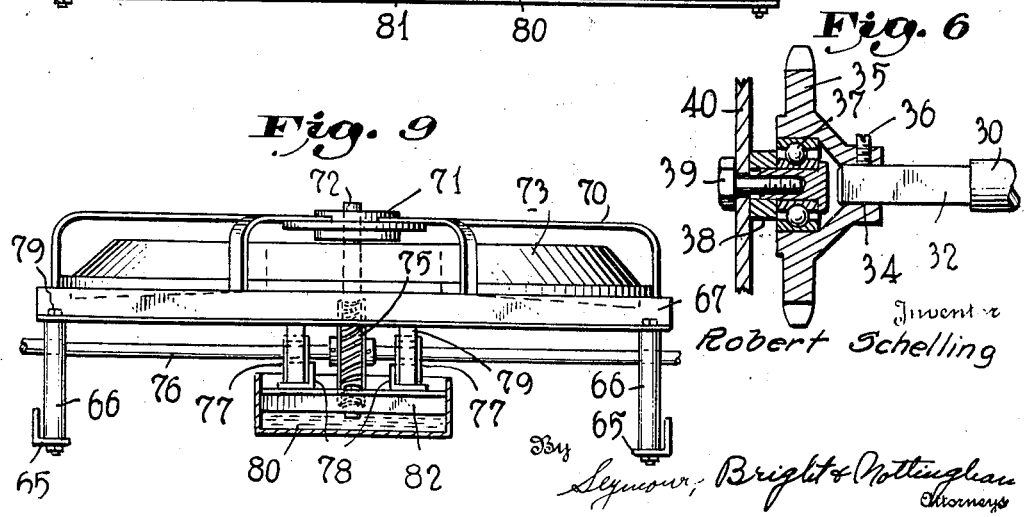

Patented June 8, 1943

2,321,427

UNITED STATES PATENT OFFICE 2,321,427

COOKING EQUIPMENT

Robert Schelling, Easton, Pa.

Application January 21, 1942, Serial No. 427,643

2 Claims. (Cl. 126—14)

This invention relates to the art of cooking, and more particularly to a novel method and apparatus for cooking foodstuffs over or adjacent to an open fire.

One of the objects of the invention is to provide a cooking apparatus of the visible type to permit the chef and spectators to observe foodstuffs while cooked over a grill fire, the heat from which is utilized to move the foodstuffs undergoing cooking in such manner that the speed of the equipment is controlled by the fire itself.

Another object is to supply cooking equipment having one or more spits to support fowl or the like undergoing cooking, the spit or spits being rotated in accordance with the heat from an open fire.

A further object is to furnish an open cooking apparatus in which the juice or drippings from one foodstuff may descend and be used for basting and flavoring another foodstuff immediately beneath the same.

A still further object is to provide cooking elements which may be installed in an open fireplace and its chimney.

Still another object is to supply an open cooking apparatus including parts which may be readily dismantled in order that the equipment may be rapidly removed from a fireplace and its chimney whenever desired.

A further object is to produce a simple and inexpensive apparatus, and yet one which will be exceedingly effective for the purpose for which it is designed.

With the foregoing and other objects in view which will appear as the description proceeds, the invention consists in the novel features hereinafter described in detail, illustrated in the accompanying drawings, and more particularly pointed out in the appended claims.

In the drawings:

Fig. 1 is a front elevation of a fireplace and a portion of its chimney with my equipment installed therein.

Fig. 2 is a side elevation of the same, with portions of my equipment shown in dotted lines.

Fig. 3 is an enlarged vertical sectional view of a portion of the equipment which is used to suspend and rotate meat to be roasted.

Fig. 4 is a front elevation, partly broken away, of the spit, its supporting bench, and drip pan.

Fig. 5 is a side elevation of the same.

Fig. 6 is a diametrical sectional view of the spit sprocket and illustrating the means for supporting the same.

Fig. 7 is a top plan view of the fan or heat motor unit of the apparatus.

Fig. 8 is a vertical sectional view of the same, taken on the line 8—8 of Fig. 7.

Fig. 9 is a side elevation of such unit, taken at right angles to the view shown in Fig. 8.

Referring to the drawings in detail, 10 designates a fireplace which is constructed of any suitable materials such as brick, and includes side walls 11, a rear wall 12, and a front wall 13. These walls, with the exception of the front wall, extend upwardly from a suitable foundation 14, while the front wall terminates at 15 in spaced relation to the foundation to provide a hearth space or recess 16.

A chimney 17 projects upwardly from the walls.

Arranged within the fireplace, on the front of the back wall thereof, is a grate 18 for the reception of any suitable solid fuel 19, such as wood, charcoal or the like.

Arranged in the hearth, immediately forward of the grate, is a bench 20 which may be constructed as shown in Figs. 4 and 5. For example, it may comprise bottom angle irons 21 to rest on the foundation 14. To these angle irons are connected the lower ends of short legs 22 and longer legs 23 which in turn support upper angle irons 24 that are connected together by a cross bar 25. Brace irons 26 connect the medial portion of the bar 25 to the lower angle irons 21.

The bench is designed to slidably support a drip pan 27.

As shown in Figs. 4 and 5, the legs 23 extend upwardly above the pan, and each of these legs has rigidly secured to its upper end, a notched plate 28, 29 designed to rotatably support a removable spit 30 which has a cone-shaped point 31 at one end thereof, and a terminal 32 of polygonal cross-section at the opposite end thereof. The end portions of the spit extend into the end portions of the plates 28, 29 and are rotatably supported by rollers 33 mounted on the plates 28, 29. As best shown in Fig. 6, the terminal 32 of the spit is adapted to enter a polygonal cavity 34 of a sprocket wheel 35, and to be secured to the latter by any suitable means such as a jam screw 36. The sprocket is preferably mounted on an anti-friction bearing 37 carried by a horizontal support 38 that is secured by a screw 39 to a post 40, connected by a tie-bar 41 to the plate 29.

It will be obvious from the foregoing that the spit may be used to pierce and support a number of fowl 42 or meat, as illustrated in Figs. 1 and 2, and after piercing, the spit can be mounted on the plates 28, 29, and its terminal 32 be secured to the sprocket 35.

Immediately above the spit, channel irons 43 are secured to the roof portion 15 of the hearth by any suitable means such as expansion bolts 44, and each channel iron is used to rigidly support stirrups 45, each having a bottom 46 and vertical walls 47. The side walls support bearing members 48 of any preferred construction in which there is journaled a horizontal shaft 49 arranged parallel to and immediately above the spit 30.

A sprocket wheel 50, fixed to shaft 49, is employed to drive a sprocket chain 51 which in turn drives the spit sprocket wheel 35.

The shaft 49 is also utilized to rotate supports 52 of any desired construction. For example, each support may be provided with an eye 53 for the reception of a meat supporting hook. Each support is detachably secured to a rotatable vertical stub shaft 54 which extends through the bottom 46 of a stirrup and is fixed to a bevel gear 55. Between the parts 46 and 55, antifriction bearings 56 may be arranged to facilitate rotation, which is accomplished by means of bevel gears 57, fixed to the shaft 49 and meshing with the gears 55.

As shown in Fig. 3, the shaft 49 extends through one of the walls 11 and is supported by an antifriction bearing 58 arranged therein. The external end of the shaft supports a fixedly mounted sprocket 59 which may be turned by any suitable means, but which I prefer to turn by the heat motor, best illustrated in Figs. 7 to 9 inclusive. Such motor may be in the form of a drawer unit 60 (Fig. 2), that is slidably mounted on ledges or tracks 61 at opposite sides of the chimney flue. These tracks form continuations of the bottom surface 62 of a doorway 63 in the front wall of the fireplace. Such doorway is normally closed by a door 64 (Figs. 1 and 2), so as not to interfere with the chimney draft.

Referring to Figs. 7 to 9, the heat motor may consist of bottom angle irons 65 to which corner posts 66 are rigidly connected. Upper angle irons 67 are rigidly mounted at the tops of the posts and they in turn rigidly support a hood 68 provided with a circular draft aperture 69. A spider or cage 70 is carried by the hood and positioned above the aperture, and in turn supports the upper bearing 71 of a vertical shaft 72. A fan or propeller wheel 73 has its hub fixed to the shaft so that the turning of the propeller, due to the heat or draft through the chimney, will cause rotation of the shaft. The shaft has a worm 74 meshing with a worm gear 75 fixedly mounted on a cross shaft 76 journaled in anti-friction bearings 77 supported by parallel angle irons 78. These irons are in turn rigidly supported by pins 79 depending from the upper angle irons 67.

For lubricating purposes, an oil pan 80 is suspended from the angle irons 78, and within the oil pan is a lower thrust bearing 81 for the shaft 72, such bearing being carried by a pair of short angle irons 82 arranged below and rigidly connected to the angle irons 78. It will be noted that the worm gear 75 dips into the oil pan, and therefore, during rotation of the worm gear, it will carry oil up to the worm 74 from which it will descend through the bearing 81 to the pan or reservoir 80.

The shaft 76, driven by the gear 75, is detachably connected to the bearings 77 and gear 75, and it extends through one of the side walls of the fireplace and terminates in a sprocket wheel 83 (Figs. 1, 2 and 7). Such wheel is connected by a sprocket chain 84 to the sprocket wheel 59, so that the parts 52 and the spit 30 can be turned by the heat motor.

For draft control purpose, I may partially close the hearth 16 by a screen 85 of sheet metal or the like. The lower edge of the front of the screen terminates above the elevation of the pan 20, so that the latter may be pulled out or pushed in from the front of the fireplace without disturbing the screen. The screen is of a portable nature and is preferably mounted on runners 86 to allow it to be slid about over the ground surface, and to facilitate such movement, the screen is provided with handles 87. A window opening 88 is provided in the front of the screen and has a vertically sliding sash 89 with transparent window panes 90.

In using the apparatus, it will be understood that fuel is first placed in the grate 19, and afterwards, hams 91 or the like, which are to be roasted, are suspended from hooks supported by the members 52. At the same general time, the spit 30 is placed through the fowl 42 or the like, which are to be roasted, and the spit is mounted on the plates 28, 29 and rigidly secured to the sprocket wheel 35. During such operations, the screen 85 will be entirely removed.

When the fire is started in the grate, the heat and gases of combustion will travel up the chimney and cause rotation of the heat motor which in turn will cause movement of the supports 52 and spit 30. Thus, the speed of the parts 30 and 52 is controlled by the fire itself, and the food undergoing cooking will be attractively displayed to those interested in watching the operation of the equipment.

Due to the arrangement of the supports 52 directly above the spit, it is obvious that juices exuding from the foodstuffs cooked above will drip and serve to baste the foodstuffs undergoing cooking below. This is particularly desirable in imparting flavors to certain meats, for example, in basting fowl with the juices from pork or the like.

From the foregoing it is believed that the construction, operation and advantages of the invention will be readily understood by those skilled in the art, and it is apparent that changes may be made in the details disclosed, without departing from the spirit of the invention, as expressed in the claims.

What I claim and desire to secure by Letters Patent is:

1. In combination, a masonry fireplace having side walls, a rear wall, an open front formed by a cavity from which rises a chimney flue, and a ceiling in the cavity between the flue and the open front, means within the cavity and mounted on the rear wall for maintaining on open fire, a horizontally disposed rotatable spit arranged within the cavity forwardly of said means, a stirrup depending from said ceiling, a horizontal shaft extending through the sides of the stirrup, a vertically disposed foodstuff supporting member depending from the bottom of the stirrup, and arranged immediately above the spit, power transmitting means for driving said member from said shaft, and means for simultaneously turning the spit and said shaft, whereby food supported by the spit and said member are rotated in front of the open fire.

2. In combination, a masonry fireplace having side walls, a rear wall, an open front formed by a cavity from which rises a chimney flue, and a ceiling in the cavity between the flue and the open front, means within the cavity and mounted on the rear wall for maintaining an open fire, a horizontally disposed rotatable spit arranged within the cavity forwardly of said means, supporting means depending from said ceiling, a horizontal shaft extending through the supporting means, a vertically disposed foodstuff supporting member depending from the bottom of the supporting means and arranged immediately above the spit, power transmitting means for driving said member from said shaft, and means for simultaneously turning the spit and said shaft, whereby food supported by the spit and said member are rotated in front of the open fire.

ROBERT SCHELLING.